US006764704B2

(12) United States Patent
Schub

(10) Patent No.: US 6,764,704 B2
(45) Date of Patent: Jul. 20, 2004

(54) BEVERAGE WHIPPING DEVICE

(76) Inventor: Arie Schub, 8 Hatzvi Street, Tel-Aviv (IL), 61441

( * ) Notice: Subject to any disclaimer, the term of this patent is extended or adjusted under 35 U.S.C. 154(b) by 0 days.

(21) Appl. No.: 10/380,007

(22) PCT Filed: Aug. 16, 2001

(86) PCT No.: PCT/IL01/00771

§ 371 (c)(1),
(2), (4) Date: Jun. 5, 2003

(87) PCT Pub. No.: WO02/21945

PCT Pub. Date: Mar. 21, 2002

(65) Prior Publication Data

US 2003/0177914 A1 Sep. 25, 2003

(51) Int. Cl.[7] .............................. A23F 5/00; B01F 3/04
(52) U.S. Cl. .................... 426/474; 426/519; 99/348; 366/129

(58) Field of Search .................. 426/474, 519; 99/348; 366/129

(56) References Cited

FOREIGN PATENT DOCUMENTS

CA          567869      * 12/1958

* cited by examiner

Primary Examiner—Anthony Weier
(74) Attorney, Agent, or Firm—Edward Langer; Shiboleth, Yisraeli, Roberts, Zisman & Co.

(57) ABSTRACT

There is disclosed beverage a beverage whipping apparatus having a motor for creating rotational motion, a rod having a first end and a second end, a whipping head that is in communication with the first end of the rod, and a torque reducing member intermediate the motor and the rod. This torque reducing member is in communication with the motor and the second end of the rod. Also included is a method for manufacture of the beverage whipping apparatus.

6 Claims, 2 Drawing Sheets

BEVERAGE WHIPPING DEVICE

FIELD OF THE INVENTION

The present invention is related to whipping devices and in particular for whipping devices used in liquids or mixtures thereof for frothing liquids or soluble solids therein.

BACKGROUND OF THE INVENTION

Beverages, such as coffee, both hot and cold, are enjoyed throughout the world. With hot beverages, especially coffee, many people prefer to drink this beverage with a milk or other similar foam at the top of the serving container, typically a glass, cup or the like. Moreover, decorative drinks have become fashionable, with hot and cold coffee drinks including foamed or froth, single or multiple layers therein both. These drinks are both aesthetic and tasty.

Production of these foam or frothed layer(s) typically requires commercial type machines, such as those found in restaurants and coffee shops that foams and froths milk or the like, by boiling or steaming, and pressurizing the milk or the like. These machines are typically, large, bulky and expensive, making them prohibitive and unsuitable for domestic uses. Even machines specifically designed for the domestic market do not produce foams and froths equivalent to those of the commercial type machines.

Even with the resultant foam or froth produced, significant labor is required to make the foam or froth layer or layers aesthetically pleasing. Moreover, for example, when making milk froth layers in coffee or similar drinks, significant skill of the prepare is required, to select the correct amount of layers, and thicknesses thereof, so as to create the proper balance of milk to coffee, resulting in the desired taste.

The whipping device disclosed in Israel Patent No. 120490, was a first step, and successful step toward providing a low cost domestic use device, for frothing and foaming milk, soluble powders or other liquids, both in and out of drinks such as coffee, hot and cold, or the like. This device however, had drawbacks.

Initially, through multiple uses over time, the bar supporting the whipping head came out of alignment. Also, due to the delicate nature of the bar, it became bent. This resulted in the whipping head moving in a distorted manner with less power, and vibrating, losing energy such that the desired liquid was incompletely or not frothed at all, when the rod was placed into a liquid mixture or the liquid itself.

From a manufacturing standpoint, production was costly, as the whipping head had to be manually balanced on the rod. The rod was also a single part, such that ultimate assembly of the device had to be done manually, in addition to the manual balancing.

SUMMARY OF THE INVENTION

The present invention provides an improvement in the art, by providing a beverage/whipping device that protects against rod bending and/or falling out of balance. It also provides a multiple piece rod, that can be easily assembled, by machines in a production line, and with less precision, resulting in lower manufacturing costs. As a result of lessening the rod length, when compared to the device detailed in Israel Patent No. 120490, the drive member decreases torque on the rod, resulting in more concentrated whipping, with less chance of the rod bending or falling out of alignment.

An embodiment of the present invention provides a whipping apparatus having a motor for creating rotational motion, a rod having a first end and a second end, a whipping head that is in communication with the first end of the rod, and a torque reducing member intermediate the motor and the rod. This torque reducing member is in communication with the motor and the second end of the rod.

Also disclosed is a method of manufacturing a whipping apparatus that includes providing a rotating element including a shaft joining element, a rod having a whipping head at a first end thereof and a second end, and a shaft of at least two pieces, said at least two pieces correspondingly configured with respect to each other for maintaining engagement therebetween, said shaft including a first end, preferably from at least one of the pieces forming the shaft, adapted for engaging said shaft joining element, and a second end, preferably from at least another of the pieces forming the shaft, for engaging a second end of said rod. The at least two pieces of the shaft are then placed into engagement. The shaft joining element is also placed into engagement with the first end of the shaft, and the second end of the rod is placed into engagement with the second end of the shaft. The placement of the shaft pieces into engagement, and engagements of the shaft joining element and rod with the respective shaft ends, may be at the same or different times.

There is also disclosed a method for frothing liquid comprising the steps of providing at least one in a container and providing a whipping apparatus having a motor for creating rotational motion, a rod having a first end and a second end, a whipping head in communication with the first end of the rod; and a torque reducing member intermediate the motor and the rod, this torque reducing member in communication with the motor and the second end of the rod. At least a portion of the whipping head is then placed into contact with the at least one liquid, and the whipping head is rotated.

There is also a method disclosed for making layered drinks when the liquid detailed above is formed of at least two, preferably different, liquids and at least a portion of the whipping head is then placed into contact with the liquid, and the whipping head is rotated.

Another embodiment of the present invention is directed to a whipping apparatus having a motor for creating rotational motion, an arm in communication with the motor for transferring the rotational motion, a rod having a first end and a second end, and a whipping head. The whipping head is in communication with the first end of the rod. A stabilizing member or element, typically a spring or other flexible member, including elastomeric tubes or the like, is configured for receiving the arm and the second end of said rod, typically in a frictional engagement, and by connecting the rod and arm, allows for the transfer of rotational motion from the arm to the whipping head, via the rod. The flexibility of the stabilizing member allows for self-righting of the whipping head by the gyroscopic effect with the angular momentum created upon operation of the apparatus.

BRIEF DESCRIPTION OF THE DRAWINGS

The present invention will be described with reference to the attached drawings, where like reference numerals or characters indicate corresponding or like components. In the drawings.

DETAILED DESCRIPTION OF THE DRAWINGS

Figure 1:
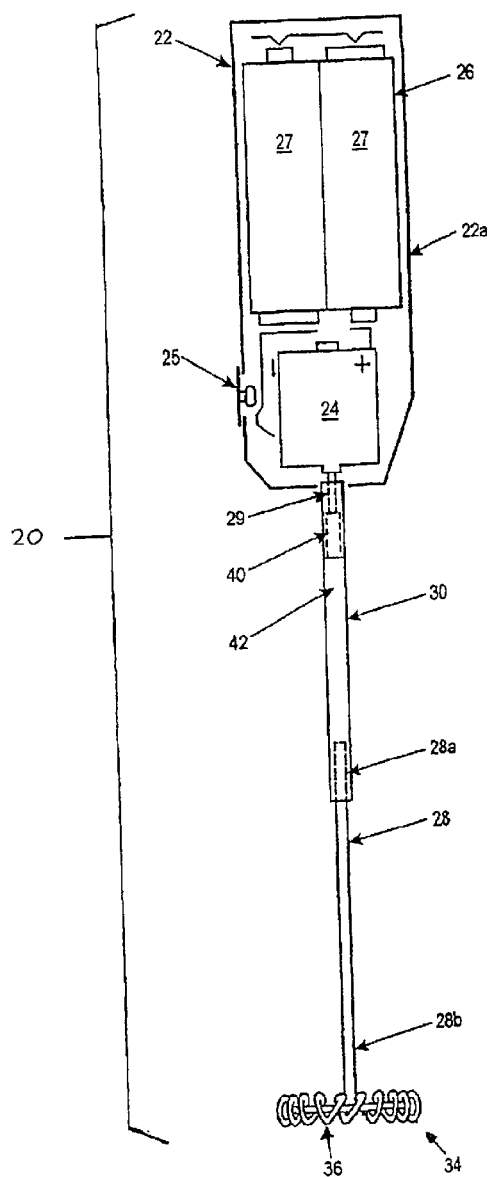
FIG. 1 is a partial cross sectional view of an embodiment of the present invention.

FIG. 1 details an apparatus 20 of the present invention. The apparatus typically includes a handle 22, preferably hollow and formed of halves or shells 22a (other shell not shown) (preferably of plastic or the like), that serves as a housing for a motor 24. The motor 24 is typically activated by a switch 25 or the like, and includes a power source 26 (typically batteries 27 or the like) and other components necessary for driving the rod 28. An arm 29 extends from the motor 24 and is received in a shaft 30. This shaft 30 preferably connects to the arm 29 of the motor 24, and that translates motion, for example, rotational and/or axial, from the motor 24 to the rod 28, and ultimately to a whipping head 34. The opposite or other end 28b of the rod 28 either terminates in, or is attached to, the whipping head 34.

Figure 2:
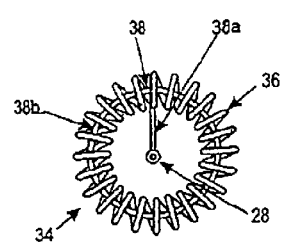
FIG. 2 is a bottom view of the embodiment of FIG. 1.

This whipping head 34, shown in FIG. 2, is preferably formed by a coil spring 36 or the like, spread over a preferably circular or rounded member 38. The member 38 is preferably a terminal portion of the rod 28 formed into a lateral portion 38a and a rounded, preferably circular portion 38b, but can also be a separate lateral and circular or rounded pieces (integral or nonintegral) attached to the rod 28, by typical fastening techniques such as welding, brazing, adhesives or other mechanical fasteners. For example, the whipping head 34 can be in accordance with the whipping head detailed in Israel Patent No. 120490, that is incorporated by reference in its entirety herein. Alternately, the whipping head could be a propeller type or other finned member attached to the end of the rod 28 by adhesives, mechanical fasteners, welds, etc.

Figure 3:
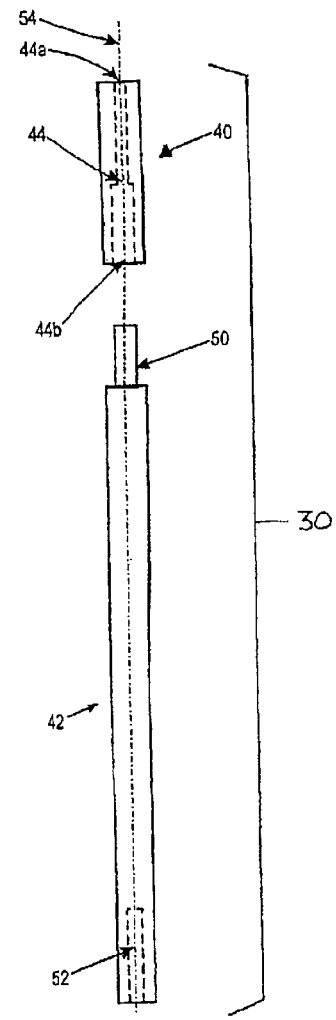
FIG. 3 is an exploded view of the shaft of the embodiment of FIG. 1.

Turning also to FIG. 3, there is detailed the shaft 30. This shaft 30 can be formed as a single piece or multiple pieces with two pieces 40, 42 preferred. This two piece construction allows for ease in manufacturing of both the pieces 40, 42 and the entire device 20, as precise manual alignment of the rod 28 has been eliminated by placement of this shaft 30 into the apparatus 20. The pieces 40, 42, are typically made of materials, such as brass, stainless steel, aluminum and the like, that are rigid and rust and corrosion resistant, or other material, including plastics and polymers, with these properties. The pieces 40, 42 could be made of the same or different materials, but it is preferred that they be compatible, so as not to rust, corrode or otherwise decompose upon being joined together.

The first piece 40 preferably includes a bore 44 extending therethrough (shown in broken lines). This bore 44 is preferably continuous and of two portions 44a, 44b, each portion of a different diameter. The larger diameter portion 44b is sized to receive the stub 50 on the second piece 42 in a frictional engagement, although additional adhesives, typically those for metal to metal bonding (as detailed above), are preferably used to enhance the engagement for long term retention.

The bore 44 is formed in this manner for simplicity and economic manufacture, as a smaller diameter bore is made first through the entire piece 40, by conventional boring, particularly metal boring, techniques, followed by a larger diameter bore through a portion of the piece 40, also by these conventional boring, particularly metal boring, techniques. The remaining smaller diameter portion is bore portion 44a, while the greater diameter portion, formed by the second boring process becomes bore portion 44b.

Upon assembly of the apparatus 20, should the stub 50 be engaged in the bore portion 44b prior to the arm 29 in the other bore portion 44a, the stub 50 will have reached its limit of travel in this bore portion 44b, and can, based on length of the arm 29, serve as a stop surface for the arm, upon its placement and engagement in the bore portion 44a.

Alternately, two separate bores could be made from each end of the piece 40 with these two separate bores, corresponding to the two bore portions 44a, 44b. These two bore portions 44a, 44b would be non-continuous. Alternately, depending on the diameters of the arm 29, or other similar member, and the stub 50, the bore 44 may be of a single diameter, or the larger diameter and smaller diameter portions reversed. Moreover, these bores and corresponding bore portions can be continuous or non-continuous, in accordance with that detailed above.

The second piece 42 is designed for connecting with the first piece 40, as a stub 50, preferably of a smaller diameter than the remainder of the piece 42, is engaged in the bore portion 44b of the first piece 40, as detailed above. The stub 50 is preferably formed on the piece by conventional metal machining techniques. The stub 50 is preferably the length of or just slightly shorter than the length of the bore portion 44b, so as to be accommodated completely in the bore portion 44b. This way, the surfaces of the pieces 40, 42, will be flush.

A bore 52 (formed as detailed above) (shown in broken lines) extends into the end opposite the stub 50 to a distance suitable for receiving and retaining the rod 28. The bore 52 is preferably of a diameter just slightly larger than that of the rod 28 in order to frictionally engage it, although it is preferred to enhance this frictional engagement with adhesives, as detailed above. The depth of the bore 52 is such that the more rod 28 taken functions to assist in reducing torque on the rod 28, detailed below.

It is preferred that the second piece 42 be longer, preferably, approximately two to six times longer, than the first piece 40. This is for economic and manufacturing reasons, as the first piece 40 must be drilled to form the bore, drilling of this sort being expensive, as it requires precision, as well as drill bits being costly. Also, the longer a drilled bore must be, the greater chance of inaccuracy, leading to more costs associated with rejected pieces, as well as the use of more drill bits.

As detailed above, it is preferred that both pieces 40, 42 be of the same diameter, so at to be flush when joined together, and it thus follows, and is preferred that bore portions 44a, 44b on the first piece 40, be configured so as to be aligned and substantially coaxial (along axis 54) with the stub 50 and bore 52 of the second piece, for overall torque reduction on the rod 28 and whipping head 34, as energy is not wasted from side to side movement as a result of a misalignment. Additionally, with the first piece 40 shorter than the second piece 42, only the rod 28 and perhaps the second piece 42 will contact the fluid upon proper usage, providing for enhanced aesthetics.

The diameter of the shaft 30 is larger, than the diameter of the rod 28. This, coupled with the pieces 40, 42 forming the shaft 30 as a rigid member, with these pieces 40, 42 configured so as to align coaxially, and further coupled with the rod 28 being received in the second piece 42 to a sufficient depth therein, results in an apparatus 20 that when in the operative mode, operates with reduced torque on the rod 28 and whipping head 34, when compared to the corresponding rod and whipping head in Israel Patent Application No. 120490, reduces torque on the rod 28 (when compared to the corresponding rod in Israel Patent Application No. 120490). By reducing torque on the rod 28 and whipping head 34, there is produced a more powerful whipping action, as the rod 28 can translate greater rotational motion to the whipping head 34, resulting from the elimination of lateral movement of the whipping head 34 as suspended on the rod 28, when the device 20 is in operation.

In this apparatus 20, the rod 28 is preferably made of metal, such as brass, stainless steel, and aluminum. The spring is preferably made of metals such as stainless steel. Propeller type whipping heads may be made of materials such as stainless steel, aluminum or the like. All materials used should preferably be such that they will not rust, corrode or otherwise decompose upon contact with fluid or other materials used to make the apparatus.

Manufacturing involves initially placing the motor 24 and power source 26 in the handle 22 and closing the halves (shells) that form the handle 22. The shaft 30 is then assembled as detailed above, as the first piece 40 preferably frictionally receives both the arm 29 in the bore portion 44a and the second piece 42, in the bore portion 44b (adhesives are preferably used in this joining process as well to enhance the joining, as detailed above). The rod 28, preferably with the whipping head attached (as (detailed above) is the placed into the bore portion of the second piece 42 preferably in a frictional engagement, with adhesives enhancing the joiner, as detailed above. The preferred adhesive is one, or a combination thereof, suitable for metal to metal bonding. These attachments and connections are permissible in any order.

In operation, the motor 24 is activated, typically by a switch 25 on the handle 22. The motor translates rotational motion to the shaft 30 that rotates the rod 28, and whipping head 34 thereon. The device 20 can be started with the whipping head 34 either in the liquid or out of the liquid, as desired. For example, milk, preferably hot milk can be frothed by placing at least a portion of the whipping head 34 into contact with the milk, typically in a container. As a second example, should milk, typically warm or hot, be placed into coffee or the like, the whipping head 34 may be placed preferably below the liquid level of the container and rotated (activated), whereby the milk is frothed within the liquid body, resulting in a layered drink. The size of the layers is dependent upon the amount of time the whipping head 34 is rotating (activated).

Figure 4:
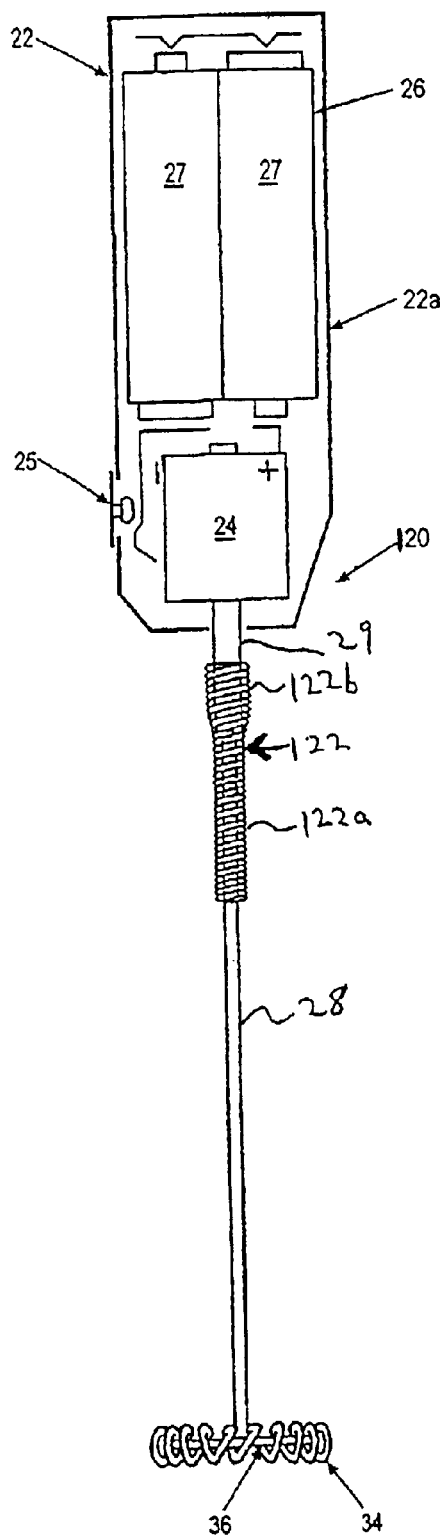
FIG. 4 is a partial cross sectional view of another embodiment of the present invention.

FIG. 4 details another embodiment of the apparatus 120 of the present invention. This apparatus 120 includes many components similar in construction and materials to those shown in FIGS. 1–3 and described above, whereby the numbering and descriptions of these components is applicable for this apparatus 120. Different components in this apparatus 120, from those of the apparatus 20 detailed above, will be noted below.

In this apparatus 120, the rod 28 connects to the arm 29 by frictionally fitting within a spring 122 or other flexible member, such as a elastomeric tube or the like. The spring 122 or other flexible member provides lateral stability to the rod 28 and the whipping head 34, when in rotation.

The spring 122 or other flexible member is preferably of two portions 122a, 122b, each portion of different internal diameters, with a smaller internal diameter portion 122a for receiving and retaining the rod 28 and a larger internal diameter portion 122b for receiving and retaining the arm 29, preferably in at least a substantially coaxial alignment. Alternately, the spring 122 or flexible member can also be of a single internal diameter. Internal diameters of the portions 122a, 122b, of the spring 122 are preferably less than, but could also be the same as the diameters of the diameters of rod 28 and arm 29, respectively. Alternately, if the spring 122 or flexible member is of a single internal diameter, this diameter should preferably be less than, but could also be equal to, the diameter that is smallest of the rod 28 or arm 29. It is preferred that the spring diameter(s) be less than the diameters of the rod 28 and arm 29, such that there be a strong frictional engagement between the inner surface of the spring portions 122a, 122b, or the spring 122 (in the case of a single internal diameter) and the outer surfaces of the rod 28 and arm 29, when a sufficient portions of the rod 28 and arm 29 are engaged in the respective portions 122a, 122b of the spring 122, or the spring 122 itself (in the case of a single internal diameter).

The rod 28 and arm 29 extend into their respective portions 122a, 122b in the spring 122 a distance so as to provide stability in a whipping operation. Extension into the spring 122 is such that the rod 28 and arm 29 are spaced apart within the spring 122 to provide lateral flexibility for the whipping operation. However, the spacing can be minimal and even to a point where the rod 28 and arm 29 abut within the spring 122.

The rod 28, arm 29 and spring 122 are preferably cylindrical in shape, and circular in diameter, outer diameter, for the rod 28 and arm 29, and inner diameter, for the spring 122. Other shapes and diameters are also permissible, provided that these members are properly retained by the spring 122 or other flexible member, to provide the rod 28 and whipping head 34 with sufficient lateral stability.

The spring 122 is typically a tubular coil spring, and of similar construction and materials like the spring 36 detailed above. The above detailed friction fit can be enhanced by adhesives (for metals, polymers, elastomers, etc., depending on the material of the spring 122 or flexible member), or other fasteners or welds. Moreover, the spring 122 or other flexible member is of a flexibility such that when in rotation, sufficient rotational energy will be transferred to the rod 28 and ultimately the whipping head 34. This transferred rotational energy, coupled with the whipping head 34 centralizing itself based on centrifugal forces (and thus minimizing energy loss from lateral forces), will result in the whipping head maximizing rotation speed and creating forces necessary for proper whipping, even when the rod 28 and arm 29 are not coaxial with respect to each other, or when the rod 28 is bent, or should the whipping head 34 becomes unbalanced, or combinations thereof. Still further, the spring 122 absorbs shock, so as to prevent bending of the rod 28.

Manufacturing is similar to that detailed above, except that the spring 122 contacts the rod 28 and arm 29 so as to receive them in the friction fit. The configuration of the spring 122 is such upon receipt of the rod 28 and arm 28 portions therein, balancing is not needed, as the spring allows for self-balancing upon rotation. Should additional securement be desired, the rod 28 and arm 29 can be pushed into the spring 122 as far as desired, provided that arm 29 operation is not impaired and the rod 28 and arm 29 have not moved past each other in the spring 122. Operation of this apparatus is in accordance with that detailed above.

While preferred embodiments of the present invention have been described so as to enable one skilled in the art to practice the invention, the preceding description is intended to be exemplary and should not be used to limit the scope of the invention. This scope of the invention should be determined by reference to the following claims.

What is claimed is:

1. A method of manufacturing a beverage whipping apparatus comprising:

providing a rotating element including a shaft joining element, a rod having a whipping head at a first end thereof and a second end, and a shaft of at least two pieces, said at least two pieces correspondingly configured with respect to each other tot maintaining engagement therebetween, said shaft including a first end adapted for engaging said shaft joining element, and a second end for engaging a second end of said rod, placing said at least two pieces of said shaft into engagement;

placing said shaft joining element into engagement with said first end of said shaft; and placing said second end of said rod into engagement with said second end of said shaft.

2. A method for frothing liquid comprising the steps of:

providing at least one liquid in a container;

providing a whipping apparatus comprising:
 a motor for creating rotational motion;
 a rod having a first end and a second end,
 a whipping head, said whipping head in communication with said first end of said rod; and a stabilizing member comprising a spring disposed intermediate said motor and said rod, said stabilizing member in communication with said motor and said second end of said rod;

placing at least a portion of said whipping head into contact with said at least one liquid; and rotating said whipping head.

3. The method of claim 2, wherein said at least one liquid includes at least two liquids.

4. A beverage whipping apparatus comprising:

a motor for creating rotational motion;

an arm in communication with said motor for transferring said rotational motion;

a rod having a first end and a second end;

a whipping head, said whipping head in communication with said first end of said rod; and a stabilizing member comprising a spring configured for receiving said arm and said second end of said rod and allowing for the transfer of said rotational motion from said arm to said whipping head.

5. The apparatus of claim 4, wherein said rod includes at least two coaxial pieces.

6. The apparatus of claim 4, wherein said stabilizing member is configured to receive said arm and said rod in a frictional engagement.

* * * * *